US010210653B2

United States Patent
Choi et al.

(10) Patent No.: US 10,210,653 B2
(45) Date of Patent: Feb. 19, 2019

(54) METHOD AND APPARATUS TO GENERATE A VOLUME-PANORAMA IMAGE

(71) Applicant: SAMSUNG ELECTRONICS CO., LTD., Suwon-si (KR)

(72) Inventors: Ouk Choi, Yongin-si (KR); Hwa-sup Lim, Hwaseong-si (KR); Jung-ho Kim, Yongin-si (KR); Do-kyoon Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 269 days.

(21) Appl. No.: 15/149,605

(22) Filed: May 9, 2016

(65) Prior Publication Data
US 2016/0267706 A1 Sep. 15, 2016

Related U.S. Application Data

(62) Division of application No. 13/566,000, filed on Aug. 3, 2012, now abandoned.

(30) Foreign Application Priority Data

Aug. 9, 2011 (KR) .................. 10-2011-0079153

(51) Int. Cl.
*G06T 15/08* (2011.01)
*G06T 3/40* (2006.01)
*G06T 11/00* (2006.01)

(52) U.S. Cl.
CPC ............ *G06T 15/08* (2013.01); *G06T 3/4038* (2013.01); *G06T 11/003* (2013.01)

(58) Field of Classification Search
CPC ...... G06T 15/08; G06T 11/003; G06T 3/4038
See application file for complete search history.

(56) References Cited

U.S. PATENT DOCUMENTS 6,154,518 A * 11/2000 Gupta .................. G06T 3/0081
378/4
7,033,320 B2 4/2006 Von Behren et al.
(Continued)

FOREIGN PATENT DOCUMENTS

JP 4299015 B2 7/2009
KR 10-0318044 B1 12/2001
(Continued)

OTHER PUBLICATIONS

Ni, D., et al. "Reconstruction of volumetric ultrasound panorama based on improved 3D SIFT," Computerized medical imaging and graphics vol. 33, 2009 (pp. 559-566).
(Continued)

*Primary Examiner* — Chan S Park
*Assistant Examiner* — Elisa M Rice
(74) *Attorney, Agent, or Firm* — Cha + Reiter, LLC

(57) ABSTRACT

A method and apparatus to generate a volume-panorama image are provided. A method of generating a volume-panorama image includes receiving conversion relationships between volume images, one of the received conversion relationships being between a first volume image of the volume images and a second volume image of the volume images, the second volume image including an area that is common to an area of the first volume image, generating an optimized conversion relationship from the one of the received conversion relationships based on the received conversion relationships, and generating the volume-panorama image based on the generated optimized conversion relationship.

22 Claims, 10 Drawing Sheets

(56) References Cited

U.S. PATENT DOCUMENTS

| | | | |
|---|---|---|---|
| 8,385,687 B1* | 2/2013 | Blais-Morin | G06T 7/337 |
| | | | 382/293 |
| 8,606,045 B2 | 12/2013 | Lee | |
| 2006/0058651 A1 | 3/2006 | Chiao et al. | |
| 2006/0239571 A1* | 10/2006 | Dong | G06K 9/32 |
| | | | 382/236 |
| 2008/0205717 A1* | 8/2008 | Reeves | G06T 7/0012 |
| | | | 382/128 |
| 2009/0264750 A1 | 10/2009 | Markowitz et al. | |

FOREIGN PATENT DOCUMENTS

| | | |
|---|---|---|
| KR | 10-2006-0050433 A | 5/2006 |
| KR | 10-0869497 B1 | 11/2008 |
| KR | 10-2010-0062889 A | 6/2010 |
| WO | WO 01/85244 A1 | 11/2001 |

OTHER PUBLICATIONS

Matas J. et al., "Robust Wide Baseline Stereo From Maximally Stable Extremal Regions", *Image and Vision Computing*, vol. 22, Issue 10, Sep. 2004, pp. 761-767.

Korean Notice of Allowance dated May 14, 2018 in Korean Application No. 10-2011-0079513 (3 pages in Korean, 2 pages in English).

\* cited by examiner

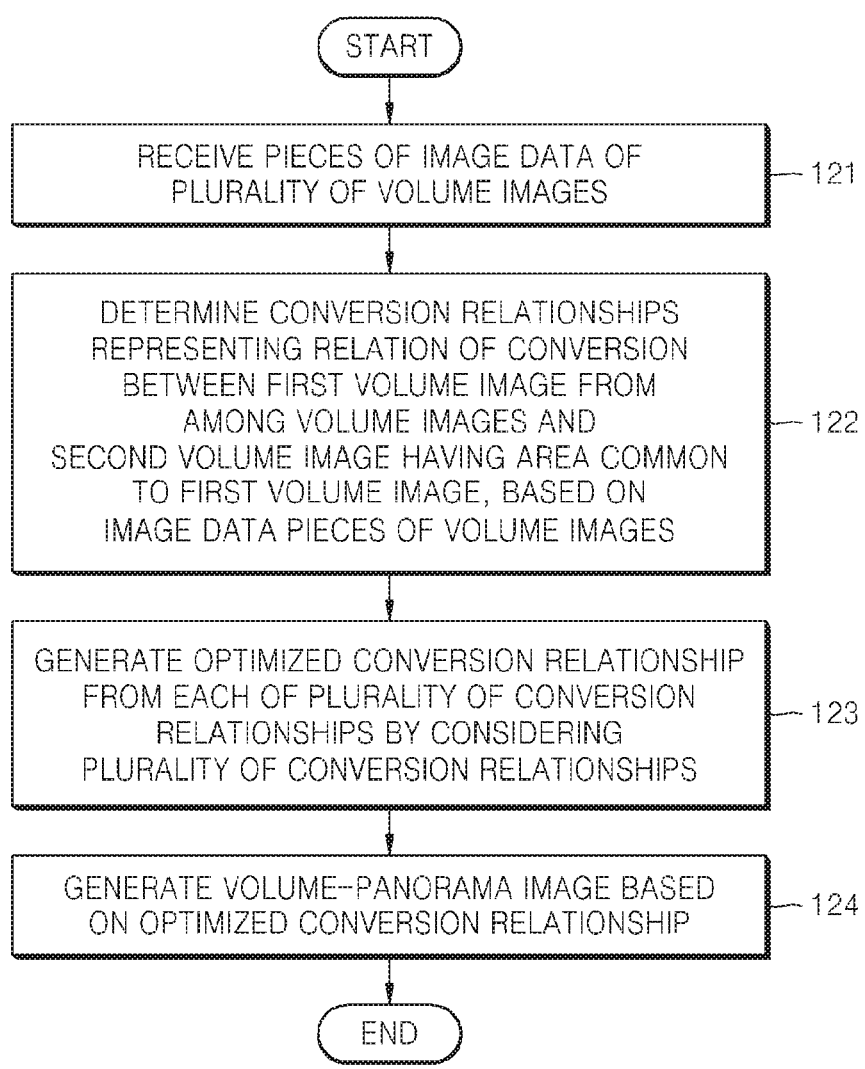

METHOD AND APPARATUS TO GENERATE A VOLUME-PANORAMA IMAGE

CROSS-REFERENCE TO RELATED APPLICATIONS

This application is a divisional of U.S. patent application Ser. No. 13/566,000 filed on Aug. 3, 2012, which claims the benefit under 35 U.S.C. § 119(a) of Korean Patent Application No. 10-2011-0079153, filed on Aug. 9, 2011, in the Korean Intellectual Property Office, the entire disclosure of which is incorporated herein by reference for all purposes.

BACKGROUND

1. Field

The following description relates to methods and apparatuses to generate a volume-panorama image.

2. Description of Related Art

Various types of medical equipment for diagnosing patients are currently in use or development. An ultrasonic imaging apparatus, a computed tomography (CT) apparatus, and a magnetic resonance imaging (MRI) apparatus are examples of medical devices often used to generate an image of a cross section of an inner portion of a target, such as, for example, a human body. These medical devices are used often in this capacity due to the relative convenience offered to a patient being scanned by these devices and the speed with which a result from the scan may be obtained. Ultrasonic imaging apparatuses transmit an ultrasonic signal toward a predetermined point of the inner portion of the target and obtain an image associated with the inner portion of the target based on information contained in an ultrasonic signal reflected by the inner portion of the target. As such, ultrasonic imaging apparatuses are relatively compact and inexpensive, capable of real-time display, and relatively safe as radiation exposure is not an issue.

Further, medical equipment has been developed that allows for the output of a three-dimensional (3D) image of the inner portion of the target. Moreover, methodology of creating a 3D panoramic image with respect to the inner portion of the target by synthesizing a plurality of 3D images into a 3D volume image has been developed to secure a larger observation region.

However, the 3D volume image may be limited with respect to providing a wide field of view. For example, an ultrasonic 3D volume image generated from an ultrasonic signal may be limited in terms of the size of a field of view by a type of probe, a configuration of transducers, a number of transducers, and the like. The field of view denotes an ultrasonic image that is obtained from a predetermined area on the target on which a probe is placed, without changing the location of the probe. For example, when a 3D volume image generating apparatus can see an observation area at a depth of about 15 cm from the skin of a target and a viewing angle of 60 to 100 degrees at one moment, a 3D volume image output from the 3D volume image generating apparatus may be limited in being used to observe organs of the target or an entire fetus at one time.

Accordingly, a wide field of view may be secured by combining a plurality of sequentially obtained 3D volume images to generate a volume-panorama image. When a volume-panorama image is generated by combining a plurality of 3D volume images, the 3D volume images are matched. In general, this matching is performed based on a conversion relationship between volume images. The conversion relationship may denote matching of the second volume image to the first volume image by moving locations and orientations of voxels included in the second volume image.

However, a conversion relationship between two or more of the plurality of volume images may cause an error to occur with respect to a conversion relationship between the other volume images. For example, when a volume-panorama image is generated by combining a first volume image, a second volume image, and a third volume image that are sequentially obtained, an error generated with respect to a conversion relationship between the first and second volume images may cause an error to occur with respect to a conversion relationship between the second and third volume images.

SUMMARY

In one general aspect, a method of generating a volume-panorama image includes receiving conversion relationships between volume images, one of the received conversion relationships being between a first volume image of the volume images and a second volume image of the volume images, the second volume image including an area that is common to an area of the first volume image, generating an optimized conversion relationship from the one of the received conversion relationships based on the received conversion relationships, and generating the volume-panorama image based on the generated optimized conversion relationship.

The method may include that the generating of the optimized conversion relationship includes generating conversion information representing the received conversion relationships and generating the optimized conversion relationship based on the generated conversion information.

The method may include that the generated conversion information includes a vector including one or more parameters extracted from each of the received conversion relationships.

The method may include that the parameters represent a relationship of an orientation conversion between the first and second volume images, a relationship of a location conversion between the first and second volume images, or a combination thereof.

The method may include that the generating of the optimized conversion relationship includes determining a similarity between morphological characteristics of the first and second volume images based on the one of the received conversion relationships and generating the optimized conversion relationship based on similarities comprising the determined similarity.

The method may include that the generating of the optimized conversion relationship further includes changing the received conversion relationships to maximize a sum of the similarities and generating the optimized conversion relationship based on the changed conversion relationships.

The method may include that the determined similarity includes a similarity between a warped morphological characteristic of the second volume image based on the one of the received conversion relationships and the morphological characteristic of the first volume image.

The method may include receiving pieces of image data of the volume images, where the generating of the volume-panorama image includes generating image data representing the volume-panorama image from the pieces of image data based on the generated optimized conversion relationship.

The method may include that the generating of the volume-panorama image further includes generating image data of one of the volume images that is to be combined with the first volume image from the image data of the second volume image based on the generated optimized conversion relationship, where the generating of the image data representing the volume-panorama image includes combining the image data of the first volume image with the generated image data of the one of the volume images that is to be combined with the first volume image.

The method may include that the generating of the volume-panorama image further includes determining a local conversion relationship based on local volume images into which the one of the volume images that is to be combined with the first volume image is split and updating the generated image data of the one of the volume images that is to be combined with the first volume image based on the determined local conversion relationship.

The method may include, where the one of the received conversion relationships is a first conversion relationship, receiving a second conversion relationship of the received conversion relationships, the second conversion relationship being between the second volume image and a third volume image of the volume images, the third volume image including an area that is common to an area of the second volume image and different from the area of the second volume image that is common to the area of the first volume image.

The method may include, where the generated optimized conversion relationship is a first optimized conversion relationship of a plurality of optimized conversion relationships, generating the first optimized conversion relationship from the first conversion relationship and a second optimized conversion relationship of the optimized conversion relationships from the second conversion relationship, the generating of the first optimized conversion relationship and the second optimized conversion relationship being based on the first conversion relationship and the second conversion relationship.

The method may include receiving pieces of image data of the volume images, where the generating of the volume-panorama image includes generating first image data of one of the volume images that is to be combined with the first volume image from the image data of the second volume image, second image data of one of the volume images that is to be combined with the second volume image from the image data of the third volume image, and image data that represents the volume-panorama image, the generating of the first image data being based on the first optimized conversion relationship, the generating of the second image data being based on the second optimized conversion relationship, the generating of the image data that represents the volume-panorama image being based on the image data of the first volume image, the first image data, and the second image data.

The method may include determining the one of the received conversion relationships based on a partial one of the received conversion relationships, the partial one of the received conversion relationships being between a partial region of the first volume image and a partial region of the second volume image.

The method may include determining the one of the received conversion relationships based on one or more parameters that normalizes the partial region of the first volume image and the partial region of the second volume image into spherical regions.

In another general aspect, there is provided a non-transitory computer-readable recording medium having recorded thereon a program for executing the method of generating a volume-panorama image.

In yet another general aspect, an apparatus to generate a volume-panorama image includes an input unit configured to receive pieces of image data of volume images, an image processor configured to generate an optimized conversion relationship from one of a plurality of conversion relationships between the volume images and generate the volume-panorama image based on the optimized conversion relationship, the one of the plurality of conversion relationships being between a first volume image of the volume images and a second volume image of the volume images, the generated optimized conversion relationship being based on the plurality of conversion relationships, and an output unit configured to output the generated volume-panorama image.

The apparatus may include that the input unit is further configured to receive the plurality of conversion relationships, where the first volume image includes an area that is common to an area of the second volume image, and where the image processor includes an optimization conversion function generation unit and a volume-panorama image generation unit, the optimization conversion function generation unit being configured to generate the optimized conversion relationship from the plurality of conversion relationships, the volume-panorama image generation unit being configured to generate the volume-panorama image based on the generated optimized conversion relationship.

The apparatus may include that the optimization conversion function generation unit includes a conversion information generation unit and a conversion information optimization unit, the conversion information generation unit being configured to generate conversion information representing the plurality of conversion relationships, the conversion information optimization unit being configured to generate the optimized conversion relationship from the plurality of conversion relationships based on the conversion information.

The apparatus may include that the first volume image includes an area that is common to an area of the second volume image, where the image processor includes a conversion relationship determination unit, an optimization conversion function generation unit, and a volume-panorama image generation unit, the conversion relationship determination unit being configured to determine the plurality of conversion relationships based on the received pieces of the image data, the optimization conversion function generation unit being configured to generate the optimized conversion relationship from the determined plurality of conversion relationships, the volume-panorama image generation unit being configured to generate the volume-panorama image based on the generated optimized conversion relationship.

In still another general aspect, a method of generating a volume-panorama image includes receiving pieces of image data of volume images, determining conversion relationships based on the pieces of the image data, one of the determined conversion relationships being between a first volume image of the volume images and a second volume image of the volume images, the second volume image including an area that is common to an area of the first volume image, generating an optimized conversion relationship from the one of the determined conversion relationships based on the determined conversion relationships, and generating the volume-panorama image based on the optimized conversion relationship.

Other features and aspects may be apparent from the following detailed description, the drawings, and the claims.

BRIEF DESCRIPTION OF THE DRAWINGS

FIG. 12 is a flowchart illustrating another example of a volume-panorama image generating method.

Figure 1:
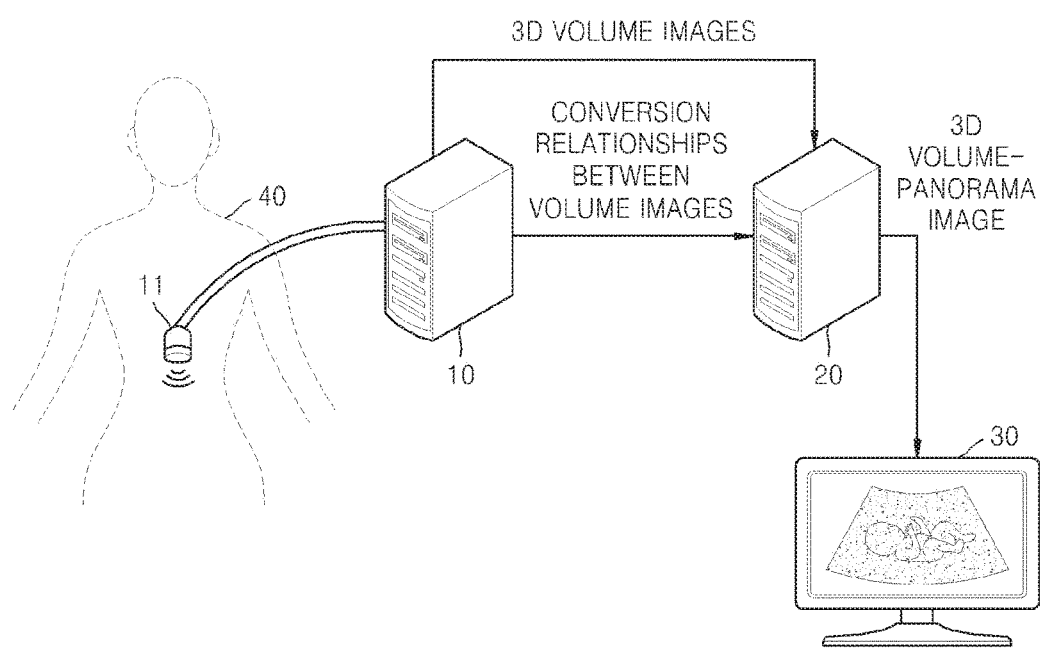
FIG. 1 is a diagram illustrating an example of a medical imaging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. In addition, descriptions of well-known functions and constructions may be omitted for increased clarity and conciseness.

FIG. 1 is a diagram illustrating an example of a medical imaging system. Referring to the example illustrated in FIG. 1, the medical diagnosing system includes a three-dimensional (3D) volume image generating apparatus 10, a volume-panorama image generating apparatus 20, and an image display 30. The 3D volume image generating apparatus 10 generates image data of volume images to represent an observation area of an inner portion of a target 40 in a 3D manner. Examples of the 3D volume image generating apparatus 10 include an ultrasonic imaging apparatus, a computed tomography (CT) apparatus, a magnetic resonance imaging Magnetic Resonance Imaging (MRI), or any other kind of medical equipment known to one of ordinary skill in the art to generate and display an image of the inner portion of a target. For example, as an ultrasonic diagnosing apparatus, the 3D volume image generating apparatus 10 generates image data of volume images to represent an observation area of the inner portion of the target 40, which a medical expert, such as a doctor, desires to diagnose in a 3D manner based on a reaction signal generated by delivering a source signal generated from a probe 11 included in the 3D volume image generating apparatus 10 to the observation area. Here, the source signal may be one of various signals, such as an ultrasound or an X ray. A case in which the 3D volume image generating apparatus 10 is an ultrasonic imaging apparatus to detect a 3D volume image from the target 40, such as a human body, based on ultrasound will now be described as an example for convenience of explanation. However, the 3D volume image generating apparatus is not limited thereto.

The probe 11 of the ultrasonic imaging apparatus is generally an array of one or more transducers. When an ultrasonic signal is delivered from the probe 11 of the 3D volume image generating apparatus 10 to the observation area of the inner portion of the target 40, the ultrasonic signal is partially reflected from layers between various different tissues. For example, the ultrasonic signal is reflected from an area having a density change in the inside of the patient's body, e.g., blood cells in blood plasma and small structures in organs. The reflected ultrasonic signals vibrate the transducers of the probe 11, and, accordingly, the transducers output electrical pulses. These electrical pulses may be converted into a 3D volume image.

The 3D volume image generating apparatus 10 generates a 3D volume image of the target 40 while changing a location and orientation of the probe 11 over the target 40. For example, the 3D volume image generating apparatus 10 generates a plurality of cross-sectional images of a predetermined part of the target 40 by delivering a plurality of ultrasonic signals to the observation area of the target 40 a plurality of number of times. Further, the 3D volume image generating apparatus 10 generates image data of a 3D volume image to represent the observation area of the inner portion of the target 40 in a 3D manner by stacking these cross-sectional images. Such a method of generating image data of a 3D volume image by stacking cross-sectional images is called a multiplanar reconstruction (MPR) method.

However, the description below is directed to obtain a volume-panorama image of a wide field of view of the inner portion of the target 40 from 3D volume images rather than to generate the 3D volume images. Thus, the above-described process of generating a 3D volume image is only an example, and examples described below may be applied to 3D volume images generated based on various other methods. For example, the examples described below may be applied to a 3D volume image generated according to a method in which a 3D reception signal including position data of an x axis, a y axis, and a z axis is received by the transducers of the probe 11 and image data of 3D volume images is generated from the 3D reception signal.

When a volume-panorama image is generated by combining a plurality of 3D volume images, the 3D volume images need to be matched. In general, this matching is performed based on a conversion relationship between volume images. In an example, a first volume image and a second volume image, from among a plurality of volume images, are matched based on a conversion relationship between the first and second volume images. Accordingly, when a volume-panorama image is generated by combining a plurality of volume images, to minimize error, respective optimized conversion relationships are generated based on conversion relationships between the volume images. According to examples described below, optimized conversion relationships are respectively generated from a plurality of conversion relationships between 3D volume images. In addition, a volume-panorama image including a plurality of volume images is generated based on the respectively generated optimized conversion relationships.

Figure 2:
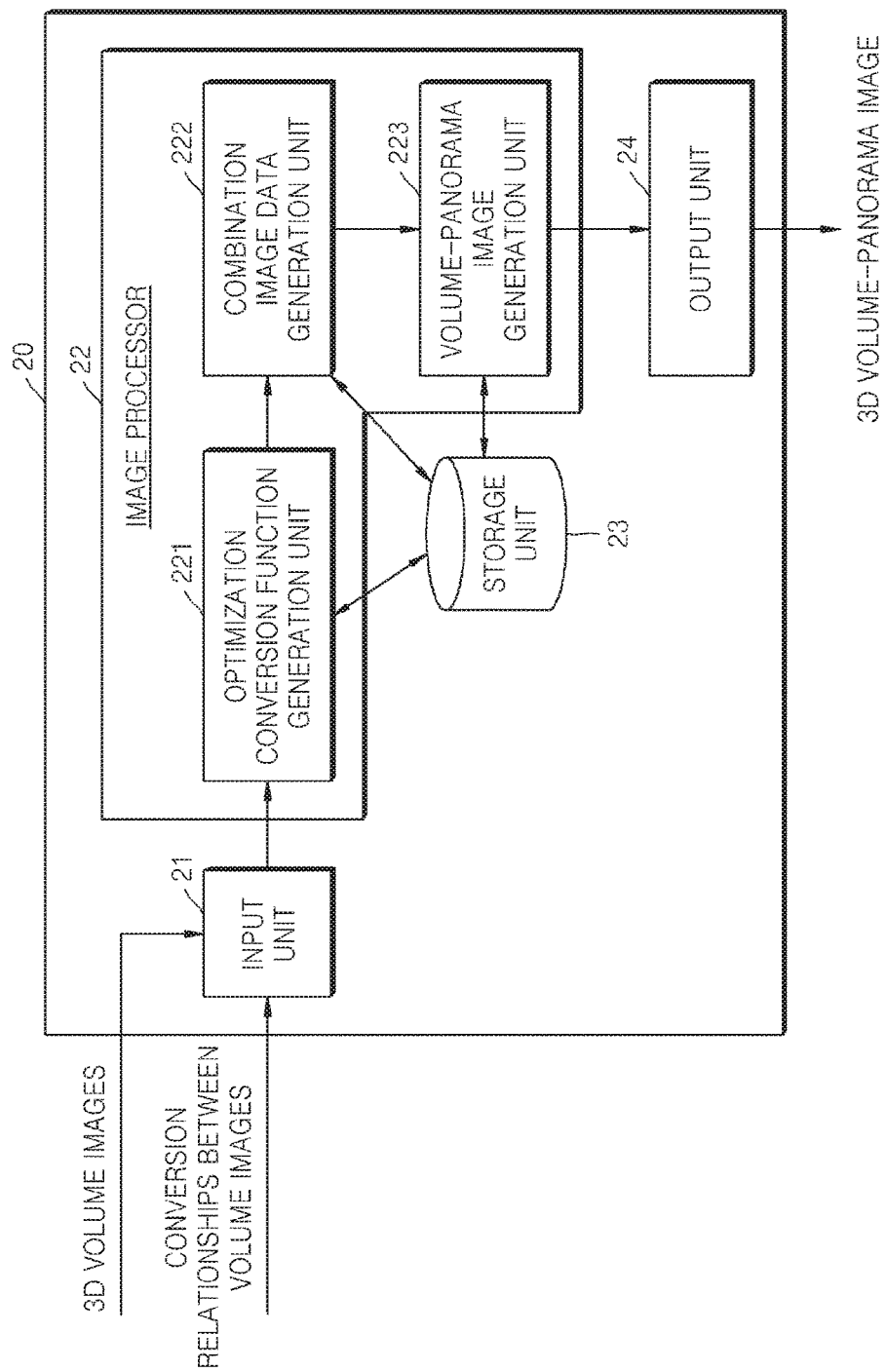
FIG. 2 is a block diagram illustrating an example of a three-dimensional (3D) volume-panorama image generating apparatus of FIG. 1.

FIG. 2 is a block diagram illustrating an example of a 3D volume-panorama image generating apparatus 20 of FIG. 1. Referring to the example illustrated in FIG. 2, the volume-panorama image generating apparatus 20 includes an input unit 21, an image processor 22, a storage unit 23, and an output unit 24. In an example, the volume-panorama image generating apparatus 20 further includes a user interface to receive a command or information from a user, such as a medical expert. The user interface may be a keyboard, a mouse, or any other input device known to one of ordinary skill in the art, or a Graphical User Interface (GUI) displayed on the image display 30.

The input unit 21 receives the image data of 3D volume images from the 3D volume image generating apparatus 10 of which an example is illustrated with respect to FIG. 1. Each 3D volume image shows an observation area of an inner portion of a target 40, of which an example is illustrated with respect to FIG. 1, in a 3D manner. In general, the input unit 21 receives pieces of image data of a plurality of 3D volume images from the 3D volume image generating apparatus 10. The 3D volume images have different observation areas. For example, one of the volume images may have an observation area corresponding to a head of a fetus in the target 40. Another of the volume images may have an observation area corresponding to a body part of the fetus in the target 40. The input unit 21 transmits the pieces of image data of the volume images received from the 3D volume image generating apparatus 10 to the image processor 22.

In an example, the input unit 21 receives, from the 3D volume image generating apparatus 10, a conversion relationship between the volume images to enable matching of two or more of the volume images. In general, one of the volume images is matched to another one of the volume images by moving locations and orientations of voxels included in the one of the volume images. As such, in this example, the conversion relationship between the volume images denotes a conversion relationship between voxels respectively corresponding to the volume images. In other words, a conversion relationship between a first volume image and a second volume image is represented by a conversion relationship between voxels corresponding to the second volume image and voxels corresponding to the first volume image. In addition, the conversion relationship between the voxels corresponding to the first volume image and the voxels corresponding to the second volume image represents a conversion relationship of the voxels corresponding to the second volume image to match the voxels corresponding to the second volume image to the voxels corresponding to the first volume image.

The voxels corresponding to the first volume image may represent the voxels included in the first volume image. Similarly, the voxels corresponding to the second volume image may represent the voxels included in the second volume image. However, the voxels described herein are not limited thereto. For example, the voxels corresponding to the first volume image may denote only voxels having intensities equal to or greater than a critical value of the voxels included in the first volume image.

In an example, the input unit 21 receives a plurality of conversion relationships between volume images from the 3D volume image generating apparatus 10. In other words, for example, the input unit 21 receives a conversion relationship between a first volume image of the volume images and a second volume image of the volume images and a conversion relationship between the second volume image of the volume images and a third volume image of the volume images from the 3D volume image generating apparatus 10. The first volume image, the second volume image, and the third volume image may be sequentially obtained volume images or randomly obtained volume images. In general, a common region exists between the first volume image and the second volume image. Similarly, a common region exists between the second volume image and the third volume image. However, the common region between the first volume image and the second volume image may be different from the common region between the second volume image and the third volume image. Such a common region may denote a common region between different observation areas of a plurality of volume images.

In an example, the input unit 21 receives a conversion relationship between a plurality of volume images from the 3D volume image generating apparatus 10. However, according to another example, the input unit 21 receives pieces of image data of a plurality of volume images from the 3D volume image generating apparatus 10, and the image processor 22 determines a conversion relationship between the volume images based on the image data pieces of the volume images. In an example in which the input unit 21 receives pieces of image data of a plurality of volume images from the 3D volume image generating apparatus 10 and the image processor 22 determines a conversion relationship between the volume images based on the image data pieces of the volume images, and conversion relationships between a plurality of volume images, the output unit 24 outputs image data of the volume-panorama image obtained by the image processor 22 combining the image data pieces of the volume images to the image display 30. The input unit 21 and the output unit 24 are interfaces to connect the image processor 22 to the 3D volume image generating apparatus 10 and the image display 30, respectively. The image display 30 displays the volume-panorama image based on the image data of the volume-panorama image received from the output unit 24. While not being limited thereto, examples of the image display 30 include a device to display a volume-panorama image on a screen or a sheet of paper.

The storage unit 23 stores various pieces of data that are generated during image processing performed in the image processor 22. For example, the storage unit 23 stores the pieces of image data of the volume images received from the input unit 21, the conversion relationships between the volume images, and the image data of the volume-panorama image that is transmitted to the output unit 24. The storage unit 23 store data such as parameters and conversion information that are to be described below. Examples of the storage unit 23 include a hard disk drive, a read only memory (ROM), a random access memory (RAM), a flash memory, a memory card, or any device known to one of ordinary skill in the art to perform storage.

Figure 3:
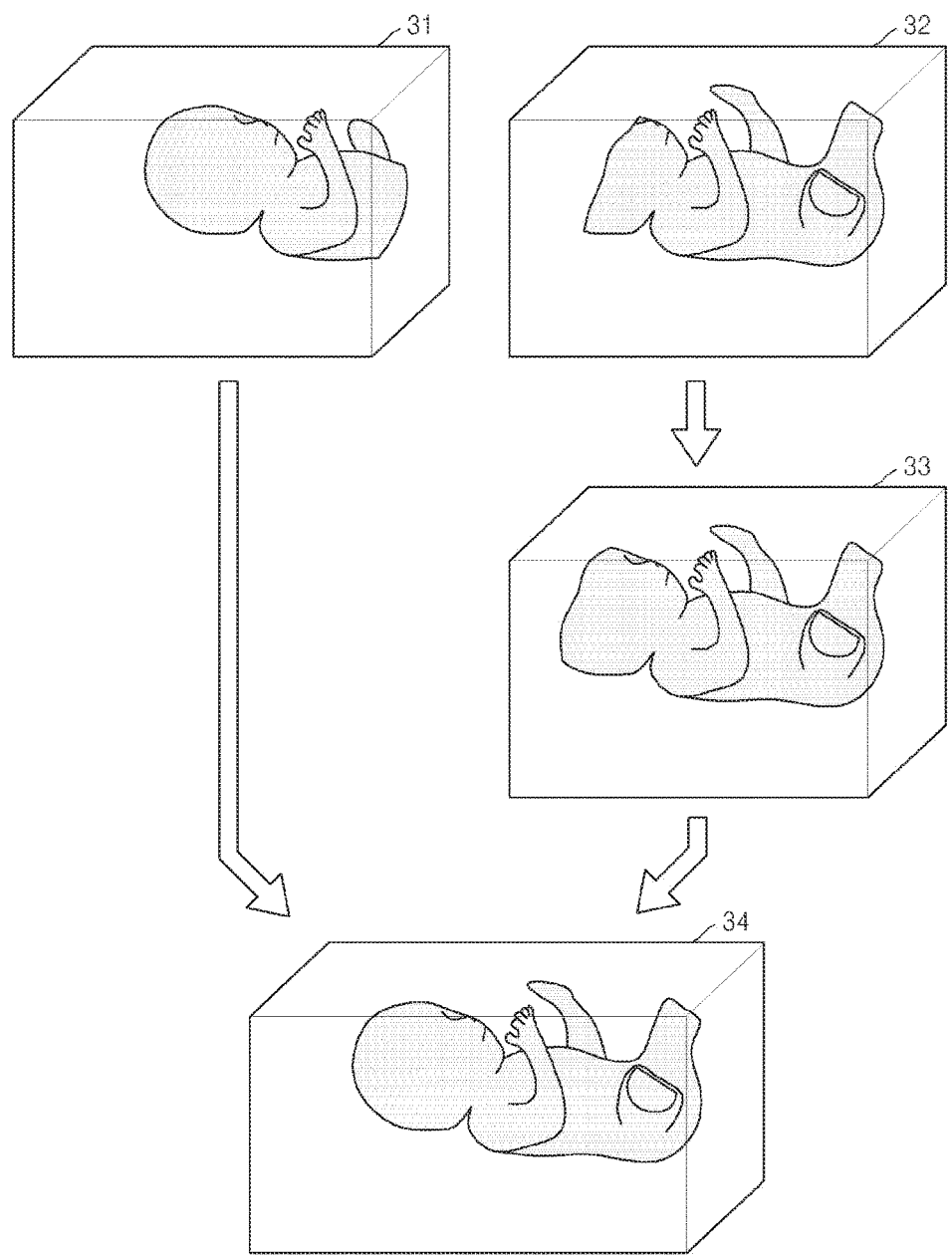
FIG. 3 is a diagram illustrating an example of generation of a volume-panorama image from a plurality of volume images in an image processor of FIG. 2.

The image processor 22 generates the image data of the volume-panorama image including the plurality of volume images received by the input unit 21 based on the pieces of the image data of the volume images. The volume-panorama image has a wider field of view than those of the volume images. FIG. 3 is a diagram illustrating an example of generation of a volume-panorama image from a plurality of volume images in an image processor 22 of FIG. 2. Referring to the examples illustrated in FIGS. 2 and 3, the image processor 22 generates image data of a volume-panorama image 34 having a wider field of view than a first volume image 31 or a second volume image 32 received by the input unit 21 based on the image data of the first volume image 31 and the image data of the second volume image 32.

The image processor 22 generates the volume-panorama image from the volume images based on an optimized conversion relationship. The optimized conversion relationship maximizes a similarity between the morphological characteristics of the volume images. Referring to the example illustrated in FIG. 3, the optimized conversion relationship denotes a conversion relationship representing a conversion relationship between the first volume image 31 and the second volume image 32 to maximize a similarity between the morphological characteristics of the first volume image 31 and the second volume image 32. However, the optimized conversion relationship is not limited thereto with respect to the example illustrated in FIG. 3. As an example, the optimized conversion relationship may denote a conversion relationship between the first volume image 31 and the second volume image 32 to maximize a similarity between the morphological characteristics of the first volume image 31 and a volume image 33 that is to be combined with the first volume image 31.

The image processor 22 generates respective optimized conversion relationships from a plurality of conversion relationships between the volume images received by the input unit 21 based on the conversion relationships, and generates the image data of the volume-panorama image based on the optimized conversion relationships. Referring back to example illustrated in FIG. 2, the image processor 22 includes an optimization conversion relationship generation unit 221, a combination image data generation unit 222, and a volume-panorama image generation unit 223.

The optimization conversion function generation unit 221 receives the conversion relationship representing a conversion relationship between the volume images from the input unit 21. The conversion relationship is determined to match the volume images when the volume-panorama image is generated by combining the volume images. Referring to the example illustrated in FIG. 3, the conversion relationship between the first volume image 31 of the volume images and the second volume image 32 of the volume images is applied to the second volume image 32 to match the second volume image 32 to the first volume image 31.

In an example, the conversion relationship between volume images is a conversion relationship between voxels respectively corresponding to the volume images. Referring to the example illustrated in FIG. 3, the conversion relationship between the first volume image 31 and the second volume image 32 is a conversion relationship between the voxels corresponding to the first volume image 31 and the voxels corresponding to the second volume image 32.

In general, voxels corresponding to each of the volume images denote voxels included in each of the volume images. However, the voxels corresponding to each of the volume images are not limited thereto. Referring to the example illustrated in FIG. 3, the voxels corresponding to the first volume image 31 may denote voxels included in a predetermined area of the first volume image 31 and voxels of an area around the predetermined area, or may denote voxels included in an observation target (for example, a fetus) from among the voxels included in the first volume image 31.

Figure 4:
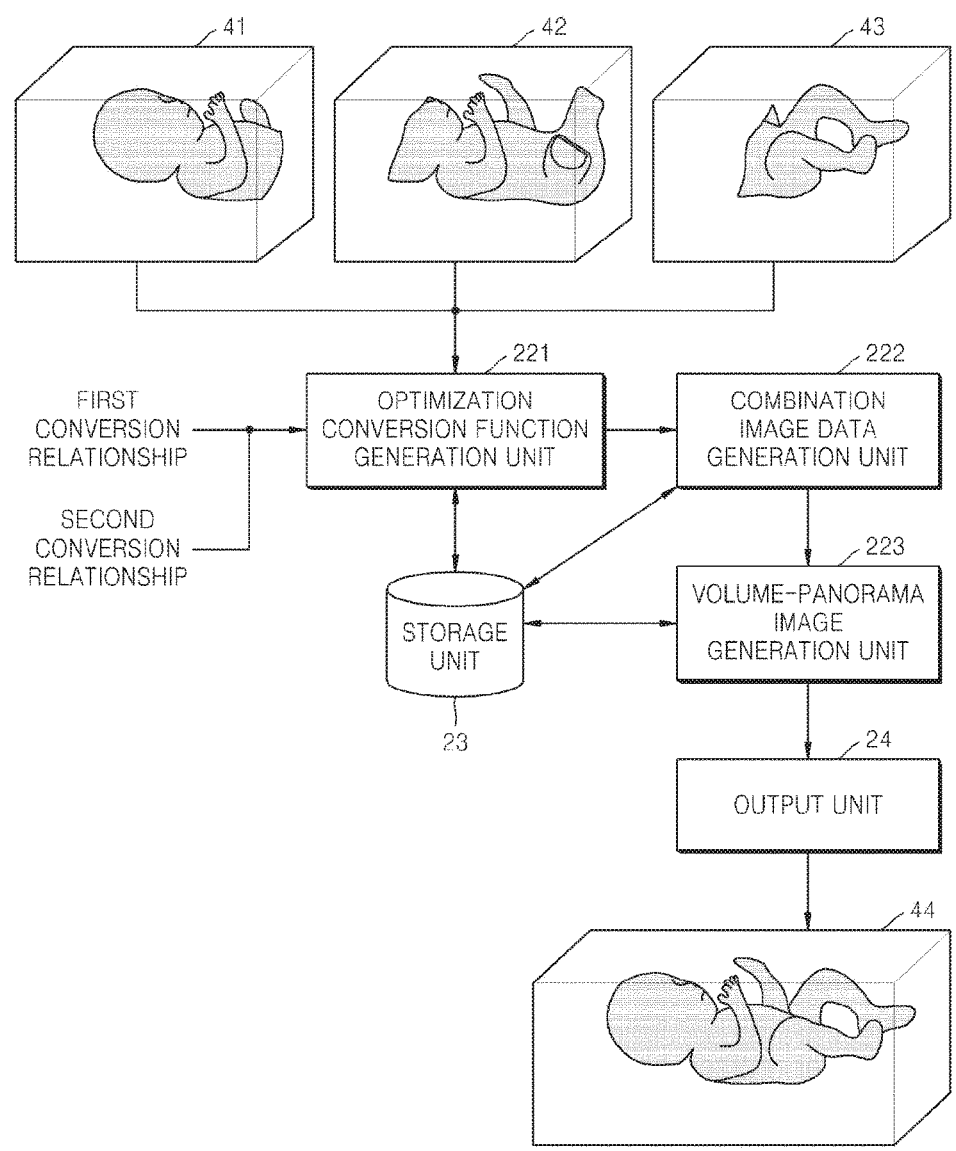
FIG. 4 is a block diagram illustrating an example of an explanation of generation of an optimized conversion relationship based on received conversion information and image data of volume images in an optimization conversion function generation unit of FIG. 2.

The optimization conversion function generation unit 221 receives a conversion relationship between one of the volume images and another of the volume images that has an area common to the one of the volume images. The optimization conversion function generation unit 221 further receives another conversion relationship that is different from the former conversion relationship. FIG. 4 is a block diagram illustrating an example of an explanation of generation of an optimized conversion relationship based on received conversion information and image data of volume images in an optimization conversion function generation unit 221 of FIG. 2. Referring to the example illustrated in FIG. 4, the optimization conversion function generation unit 221 receives a first conversion relationship between a first volume image 41 of a plurality of volume images and a second volume image 42 of the plurality of volume images, the second volume image 42 having an area common to the first volume image 41. In addition, the optimization conversion function generation unit 221 receives a second conversion relationship between the second volume image 42 of the volume images and a third volume image 43 of the volume images, the third volume image 43 having an area that is common to the second volume image 42 and different from the above-described common area of the first and second volume images 41 and 42.

In an example, the optimization conversion function generation unit 221 sequentially receives the first volume image 41, the second volume image 42, and the third volume image 43 from the input unit 21, and sequentially receives the first conversion relationship and the second conversion relationship from the input unit 21. In other words, the optimization conversion function generation unit 221 may receive the first conversion relationship between the first volume image 41 and the second volume image 42 and the second conversion relationship between the second volume image 42 and the third volume image 43 in the order in which the volume images are acquired. However, in another example, the optimization conversion function generation unit 221 determines one of the volume images to be a first volume image, and receives conversion relationships between the first volume image and each of the other volume images regardless of the order in which the volume images are acquired or input.

The optimization conversion function generation unit 221 generates an optimized conversion relationship from each of a plurality of conversion relationships. In general, both one of the conversion relationships and other conversion relationships are considered to generate an optimized conversion relationship from the one conversion relationship. The optimized conversion relationship denotes a result of a change in each of the conversion relationships. In an example, the optimized conversion relationship maximizes a similarity between the morphological characteristics of a plurality of conversion relationships. However, the example is not limited thereto.

Referring to the example illustrated in FIG. 4, the optimization conversion function generation unit 221 generates a first optimized conversion relationship from the first conversion relationship and generates a second optimized conversion relationship from the second conversion relationship, based on a plurality of conversion relationships. It is assumed that, as described above, the first conversion relationship represents a conversion relationship between the first volume image 41 and the second volume image 42 and the second conversion relationship represents a conversion relationship between the second volume image 42 and the third volume image 43. In general, the optimization conversion function generation unit 221 determines a plurality of similarities between the volume images and generates an optimized conversion relationship based on the determined similarities. Referring to FIG. 4, the optimization conversion function generation unit 221 determines a similarity between the first volume image 41 and the second volume image 42 based on the first conversion relationship between the first volume image 41 and the second volume image 42, determines a similarity between the second volume image 42 and the third volume image 43 based on the second conversion relationship between the second volume image 42 and the third volume image 43, and generates the first optimized conversion relationship from the first conversion relationship and the second optimized conversion relationship from the second conversion relationship based on a plurality of conversion relationships. As described above, in an example, the similarity between the first volume image 41 and the second volume image 42 denotes a similarity between the first volume image 41 and a volume image generated from the second volume image 42 based on the first conversion relationship.

In general, a sum of the similarities between volume images denotes a similarity between the morphological characteristics of the volume images. The morphological characteristic of each of the volume images is determined by voxels corresponding to each of the volume images. In an example, the morphological characteristic of each of the volume images is defined according to location information of the voxels corresponding to each of the volume images and an amount of information thereof. An intensity of each of the voxels serves as an example of the amount of location information of the voxels corresponding to each of the volume images. In an example, the similarity between the morphological characteristics of the volume images serves as mutual information between the volume images, which may be normalized.

The similarity may be determined in a variety of ways known to one of ordinary skill in the art, and, thus, is not limited to the above-referenced examples. For example, the similarity may denote a similarity between intensity distributions of the voxels corresponding to the volume images, a similarity between partial regions included in the volume images, a similarity between voxels that are included in the volume images and constitute respective edges of the volume images, or other similarities known to one of ordinary skill in the art.

In general, the optimization conversion function generation unit 221 changes each of the plurality of conversion relationships to maximize a sum of the plurality of similarities, and generates optimized conversion relationships from the changed conversion relationships. Referring to the example illustrated in FIG. 4, the optimization conversion function generation unit 221 changes the first conversion relationship and the second conversion relationship to maximize a sum of the similarity between the morphological characteristics of the first volume image 41 and the second volume image 42 and the similarity between the morphological characteristics of the second volume image 42 and the third volume image 43 and determines the changed first conversion relationship and the changed second conversion relationship to be the first optimized conversion relationship and the second optimized conversion relationship, respectively. In another example, the optimization conversion function generation unit 221 changes each of the conversion relationships to approximate the sum of the similarities to a predetermined critical value and to maximize or minimize a sum of parameters other than the similarities.

The generation of the volume-panorama image from the volume images is based on the optimized conversion relationships output from the optimization conversion function generation unit 221. Referring to the example illustrated in FIG. 4, the generation of a volume-panorama image 44 from the first volume image 41, the second volume image 42, and the third volume image 43 is based on the optimized conversion relationships output from the optimization conversion function generation unit 221.

Figure 5:
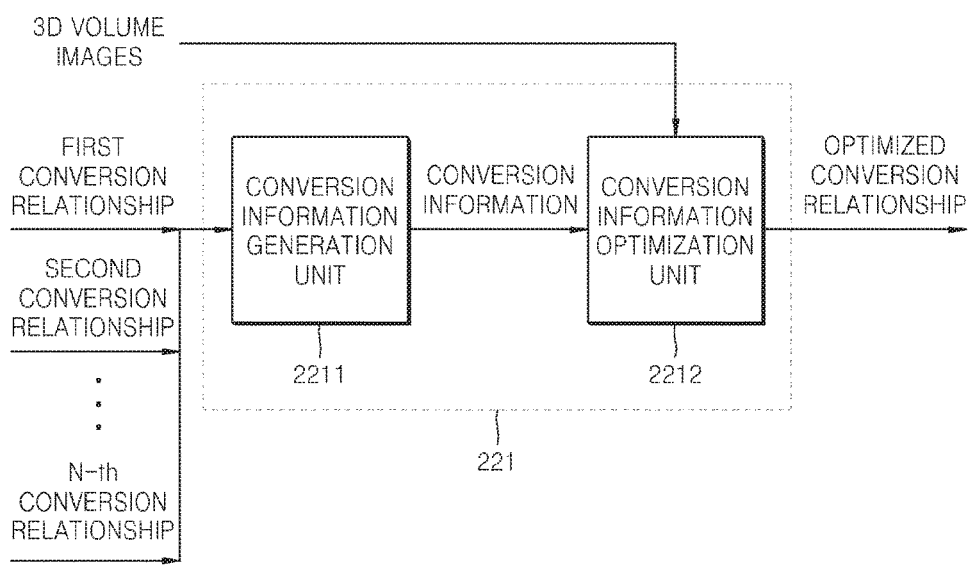
FIG. 5 is a block diagram illustrating an example of an optimization conversion function generation unit of FIG. 2.

FIG. 5 is a block diagram illustrating an example of an optimization conversion function generation unit 221 of FIG. 2. Referring to the example illustrated in FIG. 5, the optimization conversion function generation unit 221 includes a conversion information generation unit 2211 and a conversion information optimization unit 2212. The conversion information generation unit 2211 generates conversion information representing a plurality of conversion relationships. The conversion information includes a vector composed of one or more parameters extracted from each of the conversion relationships. For example, such a vector includes one or more of a parameter representing a conversion relationship between orientations of the volume images and a parameter representing a conversion relationship between locations of the volume images. In general, the parameter representing a conversion relationship between the orientations of the volume images and the parameter representing a conversion relationship between the locations of the volume images denotes a parameter representing a conversion relationship between orientations of the voxels corresponding to the volume images and a parameter representing a conversion relationship between locations of the voxels corresponding to the volume images, respectively.

The conversion information generation unit 2211 generates the conversion information based on the plurality of conversion relationships. As described above, each of the conversion relationships represents a conversion relationship between the volume images. In an example, the conversion relationship between the volume images represents a conversion relationship between the voxels corresponding to the volume images. In this example, the first conversion relationship between the first volume image and the second volume image represents a relation of conversion of one of the voxels included in the first volume image into one of the voxels included in the second volume image. The conversion relation is expressed as in Equation 1.

$$X_{n-1}=A_{n,n-1}x_n+T_{n,n-1}$$ [Equation 1]

Here, Equation 1 defines a conversion relationship between an (N−1)th volume image and an N-th volume image when conversion relationships between N volume images and (N−1) volume images are input to the conversion information generation unit 2211. Here, N denotes an integer equal to or greater than two. As described above, in an example, the conversion relationship between volume images denotes a conversion relationship between voxels respectively corresponding to the volume images. Accordingly, in this example, Equation 1 represents a relation of conversion from a voxel $x_n$ corresponding to the N-th volume image from among the N volume images to a voxel $x_{n-1}$ corresponding to the (N−1)th volume image from among the N volume images. In Equation 1, $A_{n,n-1}$ denotes a parameter representing a relation of orientation conversion from the voxels corresponding to the second volume image to the voxels corresponding to the first volume image, and $T_{n,n-1}$ denotes a parameter representing a relation of location conversion from the voxels corresponding to the second volume image to the voxels corresponding to the first volume image.

When a conversion relationship $(A_{n,n-1}, T_{n,n-1})$ between the (N−1)th volume image and the N-th volume image is assumed as an input in Equation 1, $A_{n,m}$ and $T_{n,m}$ in a conversion relationship $(A_{n,m}, T_{n,m})$ are expressed as in Equation 2.

$$A_{n,m} = \begin{cases} \prod_{k=m+1}^{n} A_{k,k-1} & \text{if } n > m \\ \left( \prod_{k=n+1}^{m} A_{k,k-1} \right)^{-1} & \text{if } n < m \end{cases} \quad [\text{Equation 2}]$$

$$T_{n,m} = \begin{cases} \sum_{k=m+1}^{n} A_{k-1,m} T_{k,k-1} & \text{if } n > m \\ -\sum_{k=n+1}^{m} A_{k-1,m} T_{k,k-1} & \text{if } n < m \end{cases}$$

Each conversion relationship is generally defined with a plurality of parameters. For example, such a parameter includes one or more of a parameter representing a conversion relationship between orientations of the volume images and a parameter representing a conversion relationship between locations of the volume images. In an example, the conversion relationship between the first volume image and the second volume image is defined with a parameter representing a conversion relationship between orientations of the first and second volume images and a parameter representing a conversion relationship between locations of the first and second volume images. As described above, in this example, a parameter representing a conversion relationship between orientations or locations of the volume images is a parameter representing a conversion relationship between orientations or locations of the voxels respectively corresponding to the volume images.

In general, the conversion relationship $(A_{n,n-1}, T_{n,n-1})$ is defined with a plurality of parameters. When a conversion relationship is a rigid transformation, the conversion relationship $(A_{n,n-1}, T_{n,n-1})$ may be expressed with six or seven parameters. For example, when the conversion relationship $(A_{n,n-1}, T_{n,n-1})$ is expressed with six parameters, three of the six parameters may be parameters that define orientation conversion, and the other three parameters may be parameters that define location movement.

For example, the parameters defining the orientation conversion are three Euler angles, and the parameters defining the location movement may be three translation vectors. For example, when the conversion relationship $(A_{n,n-1}, T_{n,n-1})$ is expressed with seven parameters, four of the seven parameters may be parameters that define orientation conversion, and the other three parameters may be parameters that define location movement.

For example, the parameters defining the orientation conversion are four quaternion elements, and the parameters defining the location movement are three translation vectors. In another example, when a conversion relationship is an affine transformation, $(A_{n,n-1}, T_{n,n-1})$ is expressed with six or seven parameters. In general, the rigid transformation represents movement and rotation and denotes transformation where the shape of an object (for example, a volume image) does not change. In other words, the rigid transformation denotes a transformation that preserves distances between every pair of points on an Euclidean space. In another example, the affine transformation denotes a transformation function that expresses transformation from points on an n-dimensional space into transformed points in a linear equation. However, the transformations are not limited to these definitions.

The conversion information generation unit 2211 generates the conversion information based on parameters that define each of the plurality of conversion relationships. In an example, the conversion information generation unit 2211 generates the conversion information based on six parameters representing the first conversion relationship and six parameters representing the second conversion relationship. As described above, the first conversion relationship represents the conversion relationship between the first volume image and the second volume image, and the second conversion relationship represents the conversion relationship between the second volume image and the third volume image. In general, the conversion information generation unit 2211 defines the parameters of each of the conversion relationships as vectors and generates the conversion information based on the vector-type parameters. Accordingly, in another example, such conversion information is a vector defined from a plurality of vectors, and is expressed as in Equation 3.

$$v = \begin{pmatrix} v_{2,1} \\ v_{3,2} \\ \vdots \\ v_{n,n-1} \\ \vdots \\ v_{N,N-1} \end{pmatrix} \quad [\text{Equation 3}]$$

Each of $v_{2,1}$ through $v_{N,N-1}$ that constitute conversion information v denotes a vector representing parameters extracted from each of a plurality of conversion relationships. In an example, when n=two to N, $v_{n,n-1}$ denotes a vector of which a plurality of parameters representing the conversion relationship $(A_{n,n-1}, T_{n,n-1})$ express.

In an example, a plurality of conversion relationships are pre-defined and input to the conversion information generation unit 2211. However, in another example, as described above, the conversion information generation unit 2211 receives only pieces of image data of a plurality of volume images and defines conversion relationships between the volume images.

The conversion information optimization unit 2212 generates an optimized conversion relationship based on the conversion information. The conversion information includes all parameters that represent each of the conversion relationships as described above. Accordingly, in an example, consideration of the conversion information by the conversion information optimization unit 2212 denotes considering the plurality of conversion relationships by the conversion information optimization unit 2212. As such, the conversion information optimization unit 2212 generates the optimized conversion relationship based on the conversion relationships.

The conversion information optimization unit 2212 generates optimized conversion relationships from the plurality of conversion relationships based on the conversion information. As described above, the conversion information includes all of pieces of information of the conversion relationships. Accordingly, in an example, the generation of the optimized conversion relationships from the plurality of conversion relationships based on the conversion information by the conversion information optimization unit 2212 denotes changing each of the information pieces of the conversion relationships included in the conversion information to generate changed conversion relationships from the conversion relationships and determining the changed conversion relationships to be the optimized conversion relationships. As described above, in an example, the changing of respective pieces of information of the conversion relationships denotes determining respective pieces of information of the conversion relationships to maximize a sum of the similarities between the volume images. Consequently, the conversion information optimization unit 2212 changes the respective information pieces of the conversion relationships included in the conversion information to maximize a sum of the similarities between the conversion relationships, and generates respective optimized conversion relationships from the conversion relationships based on the changed information pieces.

In an example, the similarity between the volume images is expressed as in Equation 4.

$$S_n = \sum_{m \neq n} S_{n,m} \quad \text{[Equation 4]}$$

In Equation 4, $s_n$ denotes a sum of similarities between an n-th volume image of the plurality of volume images and each of other volume images, namely, m volume images, of the plurality of volume images. For example, when the first volume image, the second volume image, and the third volume image are input, $s_n$ denotes a sum of a similarity between the first volume image and the second volume image and a similarity between the first volume image and the third volume image. Alternatively, when the first volume image, the second volume image, and the third volume image are sequentially input, $s_n$ denotes a sum of a similarity between the second volume image, which is input in the middle, and the first volume image, which is input first, and a similarity between the second volume image and the third volume image, which is finally input.

In an example, when a sum of the similarities between N volume images is expressed using Equation 4, the sum may be expressed as in Equation 5.

$$S = \sum_n S_n = \sum_n \sum_{m \neq n} S_{n,m} \quad \text{[Equation 5]}$$

In this example, the sum of the similarities between the volume images, S, denotes a sum of the similarities of volume image pairs that may be obtained from a plurality of volume images.

The conversion information optimization unit 2212 determines a plurality of similarities between the volume images and generates an optimized conversion relationship based on the determined similarities. In general, the conversion information optimization unit 2212 updates the conversion information to maximize the sum of the similarities, and generates optimized conversion relationships from the plurality of conversion relationships based on the updated conversion information. Referring to Equation 5, the conversion information optimization unit 2212 updates the conversion information to maximize the sum S of the similarities between the volume images, and generates optimized conversion relationships from the plurality of conversion relationships based on the updated conversion information. In an example, the updating of the conversion information denotes updating respective parameters of the plurality of conversion relationships included in the conversion information. In another example, the generation of the optimized conversion relationships from the conversion relationships based on the updated conversion information denotes generating the optimized conversion relationships from the conversion relationships based on the updated parameters.

The conversion information optimization unit 2212 applies an optimization algorithm to the conversion relationships between volume images to determine optimized conversion relationships that maximize a sum of a plurality of similarities In other words, in an example, the conversion information optimization unit 2212 updates the parameters of the conversion information representing each of the conversion relationships between the volume images to maximize the sum of the similarities based on the optimization algorithm, and determines respective optimized conversion relationships corresponding to the conversion relationships based on the updated parameters. For example, when the conversion information includes a first parameter extracted from the first conversion relationship between the first and second volume images and a second parameter extracted from the second conversion relationship between the second and third volume images, the conversion information optimization unit 2212 uses an optimization algorithm to calculate the first and second parameters maximizing a sum of the similarity between the first and second volume images and the similarity between the second and third volume images, generates a first optimized conversion relationship corresponding to the first conversion relationship based on the first parameter, and generates a second optimized conversion relationship corresponding to the second conversion relationship based on the second parameter. An example of the optimization algorithm is a Downhill Simplex algorithm. However, the optimization algorithm may be any of various optimization algorithms known to one of ordinary skill in the art. For example, the optimization algorithm may be not only a Downhill simplex algorithm but also a Conjugate Gradient algorithm, a Powell algorithm, or any of various optimization algorithms known to one of ordinary skill in the art, or may also be a group of a plurality of optimization algorithms.

The conversion information optimization unit 2212 updates the conversion information to maximize the sum of the similarities between volume images, and generates the optimized conversion relationships based on the updated conversion information. For example, the conversion information optimization unit 2212 updates the conversion information v composed of parameters extracted from a plurality of conversion relationships so that the sum of the similarities between the volume images is maximized to generate updated conversion information v*, and generates the optimized conversion relationships based on the parameters that constitute the updated conversion information v*. Referring to Equations 3 and 5, the conversion information optimization unit 2212 updates the vectors $v_{2,1}$ to $v_{N,N-1}$ included in the conversion information v of Equation 3 in order to maximize the sum S of Equation 5 to generate the updated conversion information v*, and generates the optimized conversion relationships based on the parameters that constitute the updated conversion information v*.

In another example, a similarity between volume images is determined based on a similarity between partial regions respectively included in the volume images. In this case, the similarity between partial regions denotes a similarity between the morphological characteristics of the partial regions. For example, a similarity between the first volume image and the second volume image is determined from a similarity between a first partial region included in the first volume image and a second partial region included in the second volume image. In this case, the similarity between the first partial region and the second partial region denotes a similarity between the morphological characteristics of the first and second partial regions. In this example, the morphological characteristic of each partial region is determined by normalizing the partial region into a spherical region.

Figure 6:
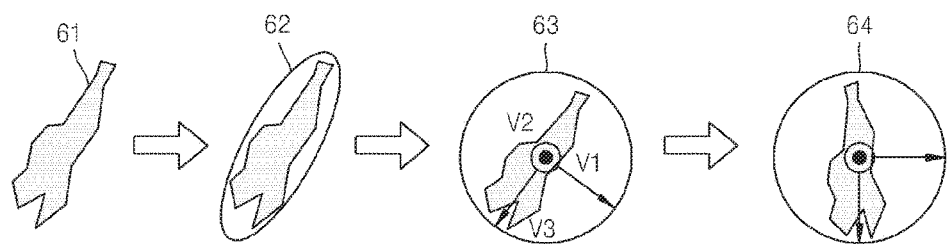
FIG. 6 is a diagram illustrating an example of a process of determining a morphological characteristic of a partial region.

FIG. 6 is a diagram illustrating an example of a process of determining a morphological characteristic of a partial region. This process is performed by the conversion information optimization unit 2212. Referring to the example illustrated in FIG. 6, the conversion information optimization unit 2212 converts a partial region 61 included in a first volume image from among a plurality of volume images into an ellipsoidal region 62, converts the ellipsoidal region 62 into a spherical region 63, normalizes the spherical region 63 to convert the spherical region 63 into a normalized spherical region 64, and determine a morphological characteristic for the partial region 61 based on the normalized spherical region 64.

Referring to the examples illustrated in FIGS. 5 and 6, the conversion information optimization unit 2212 converts the partial region 61 into the ellipsoidal region 62. In general, the conversion information optimization unit 2212 determines one of the voxels included in the partial region 61 to be a central voxel of the ellipsoidal region 62, and defines the ellipsoidal region 62 based on the central voxel. In an example, the conversion information optimization unit 2212 defines the ellipsoidal region 62 with respect to voxels x corresponding to the partial region 61, as in Equation 6.

$$(x-c)^T \Sigma^{-1} (x-c) = r^2 \qquad \text{[Equation 6]}$$

The voxels corresponding to the partial region 61 may denote voxels included in the partial region 61, or denote both the voxels included in the partial region 61 and voxels around the partial region 61. In Equation 6, $\Sigma$ denotes a central voxel selected from among the voxels included in the ellipsoidal region 62, denotes a covariance matrix, and r denotes a constant proportional to the size of the ellipsoidal region 62. The covariance matrix is also referred to as a dispersion matrix, and an element of a covariance matrix specified by positions i and j denotes a matrix representing a correlation between i-th and j-th elements of a random vector.

The partial region 61 generally denotes a predetermined region that is included in each of the volume images and is composed of one or more voxels. In general, the partial region is displayed in a 3D manner. However, the display is not limited thereto. In other words, the partial region may be displayed in a 2D manner. A plurality of voxels is included in the partial region. In an example, the partial region denotes denote a 3D region composed of 20 voxels from among the voxels included in each of the volume images. The partial region is also referred to as a 3D volume segment composed of a plurality of voxels.

The partial region 61 is extracted from each of the plurality of volume images, based on the intensities of the voxels of each of the volume images. In an example, the partial region 61 is determined as a collection of voxels having similar intensities from among the voxels based on a comparison between a plurality of intensities included in the volume images. An embodiment of extracting the voxels having similar intensities includes a method that uses maximally stable extremal regions (J. Matas et al., "Robust wide baseline stereo from maximally stable extremal regions," BMVC 2002) in a 3D manner. This is only an example and is not limiting. In another example, the intensities of neighboring voxels of a voxel arbitrarily determined from among the voxels included in the volume image with one another are compared to extract the partial region 61 from a collection of voxels having similar intensities from the voxels included in a volume image. In yet another example, the partial region 61 is extracted from the collection of voxels having similar intensities based on the location and intensity of each of the voxels included in the volume image.

Referring to the examples illustrated in FIGS. 5 and 6, the conversion information optimization unit 2212 converts the ellipsoidal region 62 into the spherical region 63. Like the above-described ellipsoidal region 62, the spherical region 63 is defined with respect to the voxels x corresponding to the partial region 61, as in Equation 7.

$$y^T y = r^2$$

$$y = \Sigma^{-T/2}(x-c) \qquad \text{[Equation 7]}$$

For example, the conversion information optimization unit 2212 decomposes the spherical region 63 to $\Sigma^{-1/2}\Sigma^{-T/2}$, since $\Sigma^{-1}$, which is the inverse matrix of the covariance matrix included in Equation 6, is a positive definite symmetric matrix. The conversion information optimization unit 2212 then defines $\Sigma^{-1/2}\Sigma^{-T/2}$ with respect to the voxels x corresponding to the partial region 61, as in Equation 7.

Referring to the examples illustrated in FIGS. 5 and 6, the conversion information optimization unit 2212 normalizes the spherical region 63 to convert the spherical region 63 into the normalized spherical region 64. The normalized spherical region 64 is defined by three vector components that cross at right angles about the central voxel of the spherical region 63. For example, the conversion information optimization unit 2212 applies a rotation matrix R to Equation 7, as in Equation 8, to define the normalized spherical region 64 with respect to the voxels x corresponding to the partial region 61.

$$y^T y = r^2$$

$$y = R\Sigma^{-T/2}(x-c) \qquad \text{[Equation 8]}$$

Referring to the examples illustrated in FIGS. 5 and 6, the conversion information optimization unit 2212 converts the voxels corresponding to the partial region 61 based on Equation 9 and uses the intensities of voxels obtained by the Equation 9 conversion to determine the rotation matrix R.

$$y' = \Sigma^{-T/2}(x-c) \qquad \text{[Equation 9]}$$

The rotation matrix R includes, as elements, three vector components that generally constitute a 3D image. Accordingly, in these examples, the conversion information optimization unit 2212 converts the voxels corresponding to the partial region 61 based on Equation 9 and sequentially detects directions having large gradients of the intensities of the voxels obtained by the conversion based on Equation 9, thereby determining the three vector components. In another example, the conversion information optimization unit 2212 warps the voxels corresponding to the partial region 61 based on Equation 9 to determine the rotation matrix R, uses a weight proportional to the magnitude of the gradient of the intensities of the voxels to make a histogram of gradient directions, determines a gradient direction having a highest frequency to be the vector V1, determines a gradient direction having a high frequency from among the two gradient directions crossing the vector V1 at a right angle to be the vector V2, and determines a gradient direction crossing both the vectors V1 and V2 at right angles to be the vector V3. Equation 10 represents the rotation matrix R of Equation 8.

$$R = \begin{bmatrix} v_1^T \\ v_2^T \\ v_3^T \end{bmatrix}$$ [Equation 10]

Referring to the examples illustrated in FIGS. 5 and 6, the conversion information optimization unit 2212 determines the morphological characteristic of the partial region 61 based on the normalized spherical region 64. In this example, the conversion information optimization unit 2212 uses Equation 8 to convert the voxels corresponding to the partial region 61 and uses the intensities of voxels obtained by the conversion using Equation 8 to generate an indicator representing an intensity gradient of each area of the normalized spherical region 64, thereby determining a morphological characteristic obtained by aggregating the indicators into a vector. Such a morphological characteristic may be represented as an invariant feature descriptor. Examples of the indicator representing a gradient include an intensity gradient orientation histogram.

Figure 7:
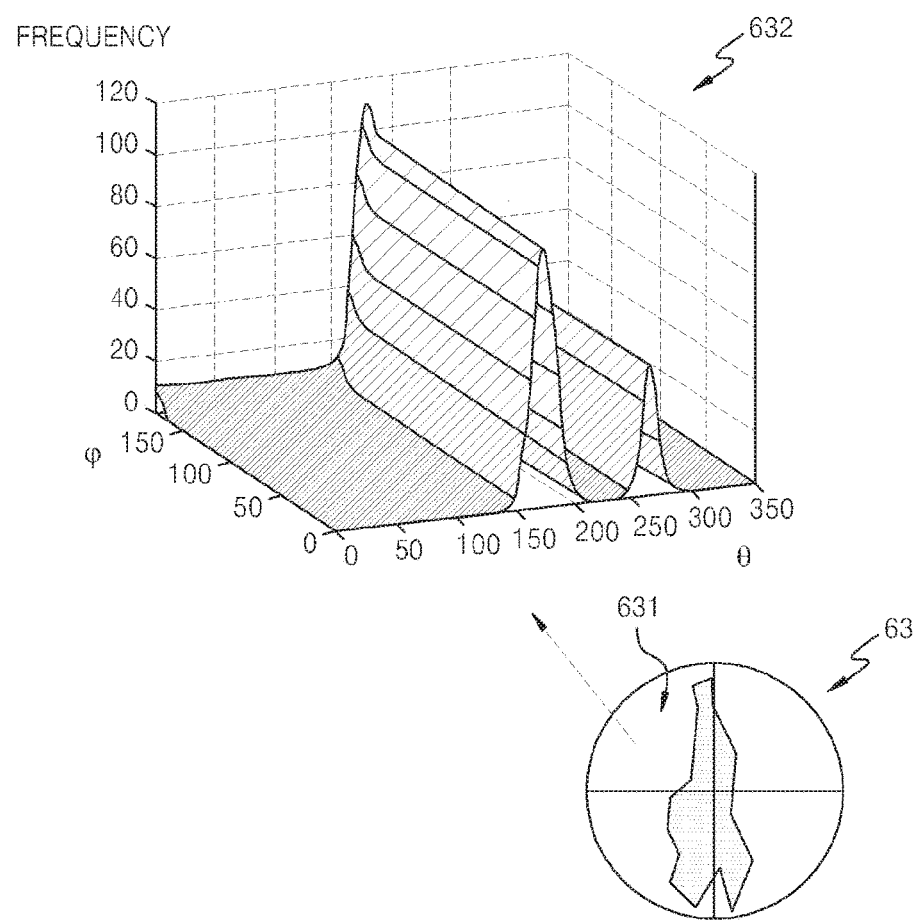
FIG. 7 is a diagram illustrating an example of an indicator representing a gradient of intensities of voxels included in one area of a normalized spherical region of FIG. 6.

FIG. 7 is a diagram illustrating an example of an indicator representing a gradient of intensities of voxels included in one area of a normalized spherical region 64 of FIG. 6. Referring to the examples illustrated in FIGS. 6 and 7, the conversion information optimization unit 2212 generates an indicator 632 representing a gradient of the intensities of the voxels included in an area 631 of the normalized spherical region 64 from among the voxels corresponding to the partial region 61. In an example, the conversion information optimization unit 2212 also generates an indicator representing a gradient of the intensities of the voxels included in the other areas of the normalized spherical region 64 and determines a morphological characteristic for the partial region 61 based on the generated indicators.

As such, in this example, the conversion information optimization unit 2212 determines the morphological characteristic of each of the volume images from the partial regions of each of the volume images. The conversion information optimization unit 2212 compares the morphological characteristics of the volume images determined from the partial regions of the volume images to determine a similarity between volume images. In an example, determining the morphological characteristic of a volume image from the partial regions included in the volume image denotes determining an average of the morphological characteristics of the partial regions included in the volume image to be the morphological characteristic of the volume image, or determining a set of morphological characteristics of one or more partial regions included in the volume image to be the morphological characteristic of the volume image. As such, in various examples, the morphological characteristic of the volume image is determined using the morphological characteristics of the partial regions of the volume image. The conversion information optimization unit 2212 determines a similarity between volume images based on a similarity between the partial regions of the volume images. For example, the conversion information optimization unit 2212 determines a similarity between the first and second volume images, based on a similarity between one or more first partial regions included in the first volume image from among the plurality of volume images and one or more second partial regions included in the second volume image from among the plurality of volume images.

In another example, the conversion information optimization unit 2212 updates conversion information to minimize a target relationship between volume images, and generates optimized conversion relationships based on the updated conversion information. For example, the conversion information optimization unit 2212 generates an edge response of each of the volume images based on the voxels included in each of the volume images, makes a target relationship by replacing a similarity between the sizes and orientations of the edge responses of the volume images with a difference between the sizes and orientations of the edge responses, and generates an optimized conversion relationship based on the target relationship.

In yet another example, the conversion information optimization unit 2212 determines the optimized conversion relationship to maximize a similarity between some of the volume images. In this example, when the conversion information is determined by parameters extracted from the first conversion relationship between the first and second volume images, the second conversion relationship between the second and third volume images, and the third conversion relationship between the third and fourth volume images, the conversion information optimization unit 2212 uses the parameters extracted from the first, second, and third conversion relationships to determine an optimized conversion relationship to maximize a sum of a similarity between the second and third volume images and a similarity between the third and fourth volume images, except for a similarity between the first and second volume images. In still another example, when the conversion information is determined by parameters extracted from the first conversion relationship between the first and second volume images, the second conversion relationship between the second and third volume images, and the third conversion relationship between the third and fourth volume images, the conversion information optimization unit 2212 uses only the parameters extracted from the second and third conversion relationships, except for the parameter extracted from the first conversion relationship, to determine an optimized conversion relationship to maximize a sum of a similarity between the first and second volume images, a similarity between the second and third volume images, and a similarity between the third and fourth volume images.

As described above, the image processor 22 generates the volume-panorama image based on the optimized conversion relationship. For example, the image processor 22 generates image data representing the volume-panorama image from image data of the volume images, based on the optimized conversion relationship. The combination image data generation unit 222 generates pieces of image data that are to be combined from the pieces of image data of the volume images based on the optimized conversion relationships generated from the conversion relationships. Referring to the example illustrated in FIG. 3, the combination image data generation unit 222 generates the image data of the volume image 33, which is to be combined with the first volume image 31, from the image data of the second volume image 32 according to the first optimized conversion relationship generated from the first conversion relationship between the first and second volume images 31 and 32.

The volume image 33 denotes a volume image obtained by reflecting the first optimized conversion relationship in the second volume image 32. In an example, the volume image 33 denotes an image obtained by matching the second volume image 32 to the first volume image 31. The combination image data generation unit 222 generates the image data of another volume image, which is combined with the second volume image 32, from the image data of a third volume image based on the second optimized conversion relationship generated from the second conversion relationship between the second volume image and the third volume image. In general, the combination image data generation unit 222 generates voxels of the volume image, which is combined with the first volume image 31, by warping the voxels included in the second volume image 32 in relation to the voxels included in the first volume image 31, according to the optimized conversion relationship. However, examples are not limited thereto.

Figure 8:
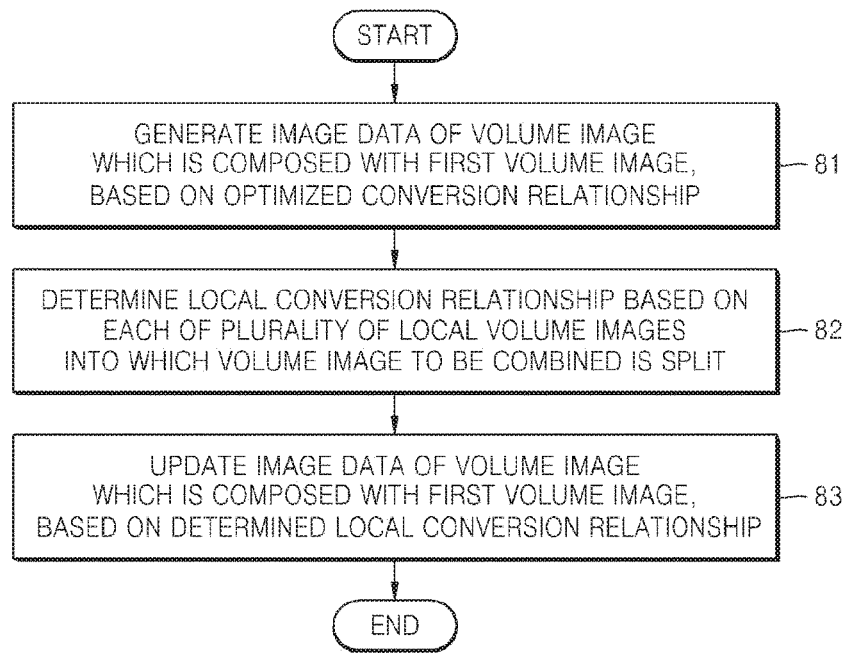
FIG. 8 is a flowchart illustrating an example of a process in which a combination image data generation unit of FIG. 2 generates image data of a volume image to be combined with a first volume image.

FIG. 8 is a flowchart illustrating an example of a process in which a combination image data generation unit 222 of FIG. 2 generates image data of a volume image to be combined with a first volume image. In an example, the process of FIG. 8 is performed by the combination image data generation unit 222, but is not limited thereto. The combination image data generation unit 222 generates (81) the image data of the volume image that is to be combined with the first volume image from the image data of the second volume image based on the one of the plurality of optimized conversion relationships. The combination image data generation unit 222 determines (82) a local conversion relationship based on one or more local volume images into which the volume image that is to be combined with the first volume image is split. For example, the combination image data generation unit 222 splits the volume image to be combined with the first volume image into a plurality of local volume images and determines a local conversion relationship for each of the local volume images.

Figure 9:
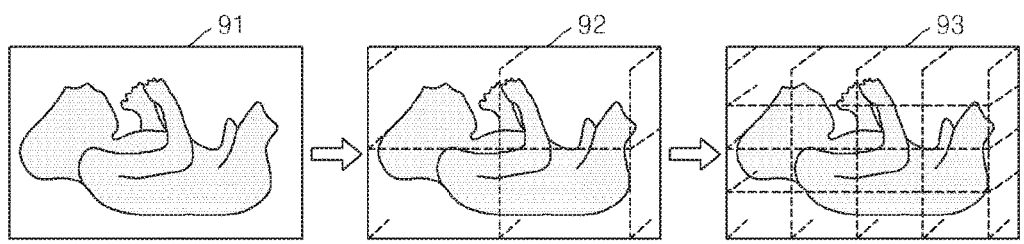
FIG. 9 is a diagram illustrating an example of splitting a volume image to be combined into one or more local volume images.

FIG. 9 is a diagram illustrating an example of splitting a volume image to be combined into one or more local volume images. For example, referring to the example illustrated in FIG. 9, the combination image data generation unit 222 splits a volume image 91 to be combined with a first volume image into a plurality of local volume images 92 and determines a local conversion relationship for each of the local volume images 92. In an example, the combination image data generation unit 222 determines the local conversion relationship for each of the local volume images 92 based on a conversion relationship between the voxels corresponding to each of the local volume images 92 and the voxels corresponding to the second volume images. In this case, the combination image data generation unit 222 applies an optimization algorithm based on the conversion relationship between the voxels corresponding to each of the local volume images 92 and the voxels corresponding to the second volume images as an initial value to determine the local conversion relationship for each of the local volume images 92. For example, the combination image data generation unit 222 applies an optimization algorithm based on an initial local conversion relationship (I, O) of each of the local volume images 92 and local conversion characteristics sampled from around the voxels associated with the initial local conversion relationships I and O. In the initial local conversion relationship (I, O), I denotes a unit matrix of three columns and three rows, and O denotes a 3D zero vector.

Referring to the example illustrated in FIG. 9, the combination image data generation unit 222 uses local conversion relationships of local volume images 92 around one of the local volume images 92 to determine a local conversion relationship of the one local volume image 92. In an example, the combination image data generation unit 222 uses the local conversion relationships of the local volume images 92 around the one local volume image 92 to interpolate the local conversion relationship of the one local volume image 92.

Referring to the example illustrated in FIG. 9, the combination image data generation unit 222 hierarchically splits the volume image 91 to be combined. In an example, the combination image data generation unit 222 splits the volume image 91 to be combined with the first volume image into four regions to generate the local volume images 92, and splits each of the local volume images 92 to generate the local volume images 93. In general, as a local volume image having many textures from among the local volume images is split into smaller regions, a more accurate local conversion relationship is obtained. Accordingly, in an example, the combination image data generation unit 222 adaptively determines a splitting amount of each of the local volume images in consideration of the number of textures included in each of the local volume images.

Referring back to the example illustrated in FIG. 8, the combination image data generation unit 222 updates (83) the image data of the volume image that is to be combined with the first volume image based on the determined local conversion relationship. For example, the combination image data generation unit 222 applies the respective local conversion relationships for the local volume images to the local volume images into which the volume image to be combined with the first volume image is split to update the image data of the volume image to be combined with the first volume image.

The volume-panorama image generation unit 223 generates image data representing the volume-panorama image, based on the image data of the volume images and the image data of volume images to be combined with the first volume image. Referring to the example illustrated in FIG. 4, the volume-panorama image generation unit 223 generates image data representing the volume-panorama image 44, based on image data of a volume image which is generated from the image data of the second volume image 42 according to the first optimized conversion relationship and is combined with the first volume image 41, image data of a volume image which is generated from the image data of the third volume image 43 according to the second optimized conversion relationship and is combined with the second volume image 42, and image data of the first volume image 41.

The volume-panorama image generation unit 223 generates the volume-panorama image by combining the voxels included in the first volume image, the voxels included in the one volume image to be combined with the first volume image, and the voxels included in another volume image to be combined with the second volume image. In general, the voxels included in the volume image that is generated from the first volume image according to an optimized conversion relationship and is combined with the first volume image correspond to the voxels included in the first volume image, respectively. However, in an example, the intensity of each of the voxels included in the volume image to be combined with the first volume image may be different from the intensity of each of the voxels included in the first volume image that correspond to the voxels included in the volume image to be combined with the first volume image. The difference between the intensities may be generally represented by a shadow effect of an ultrasonic signal. In this case, the volume-panorama image generation unit 223 generates an intensity of one of the voxels of the volume-panorama image based on the intensity of one of the voxels of the first volume image, the intensity of one of the voxels of the one volume image to be combined with the first volume image, and the intensity of one of the voxels of the other volume image to be combined with the second volume image.

In an example, the volume-panorama image generation unit 223 determines, as an intensity of one of the voxels of the volume-panorama image, the lowest or highest intensity from among the intensity of one of the voxels of the first volume image, the intensity of one of the voxels of the one volume image to be combined with the first volume image, and the intensity of one of the voxels of the other volume image to be combined with the second volume image. In another example, the volume-panorama image generation unit 223 determines, as the intensity of one of the voxels of the volume-panorama image, an average of the intensity of one of the voxels of the first volume image, the intensity of one of the voxels of the one volume image to be combined with the first volume image, and the intensity of one of the voxels of the other volume image to be combined with the second volume image.

Figure 10:
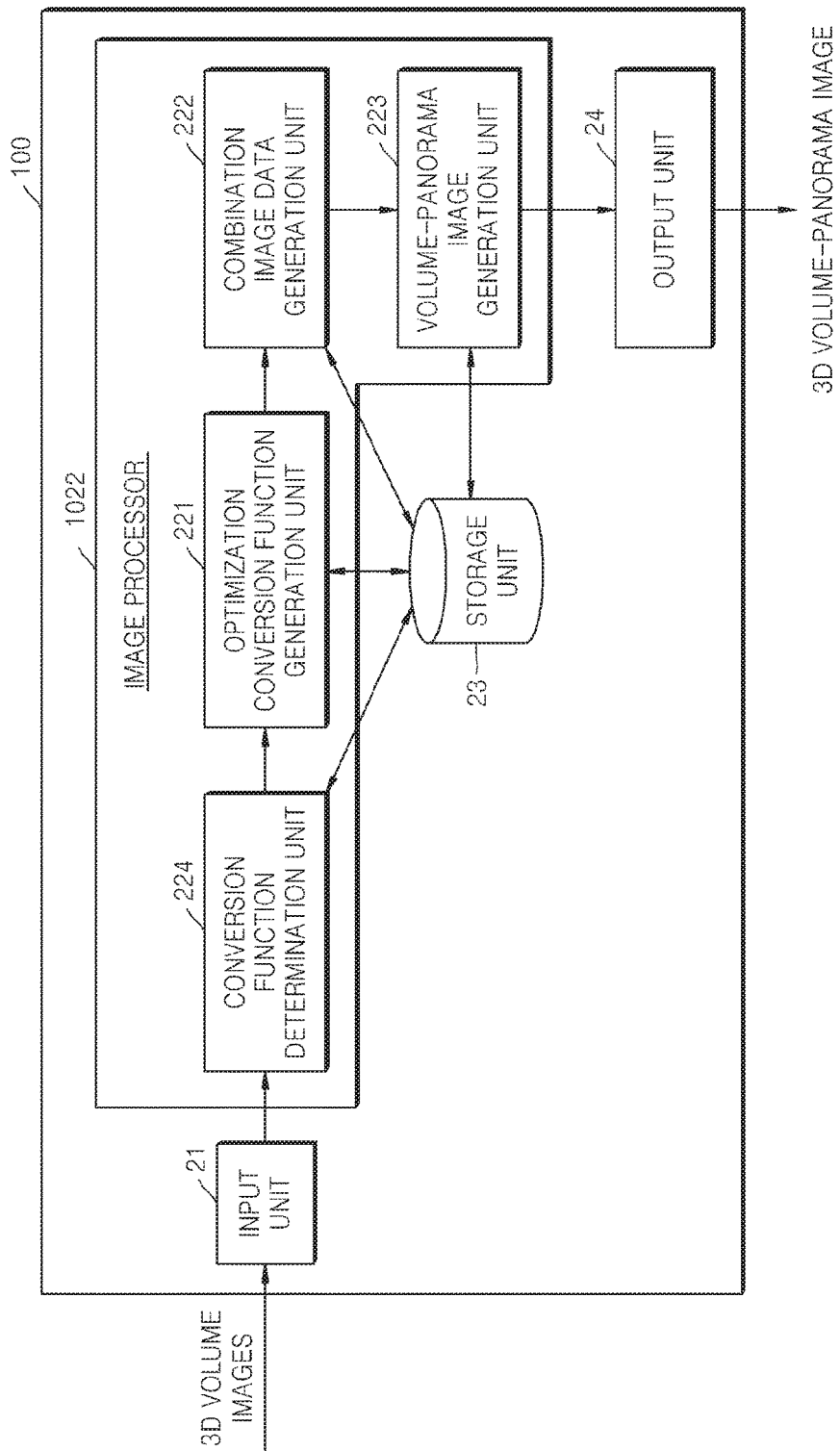
FIG. 10 is a block diagram illustrating another example of a volume-panorama image generating apparatus.

FIG. 10 is a block diagram illustrating an example of a volume-panorama image generating apparatus 100. An image processor 1022 of the volume-panorama image generating apparatus 100 of the example illustrated in FIG. 10 includes a conversion function determination unit 224 in addition to the components of the image processor 22 of the example illustrated in FIG. 2. The conversion function determination unit 224 generates conversion relationships between volume images based on the image data of the volume images received by the input unit 21, and transmits the conversion relationships to the optimization conversion function generation unit 221. The conversion relationships generated by the conversion function determination unit 224 may refer to the description given above with respect to a plurality of conversion relationships between a plurality of volume images.

In an example, the conversion function determination unit 224 determines conversion relationships between the plurality of volume images, based on partial conversion relationships between the partial regions included in the volume images. In this example, the conversion function determination unit 224 determines a partial conversion relationship between a first partial region of the first volume image from among the plurality of volume images and a second partial region of the second volume image from among the plurality of volume images, and determines a conversion relationship between the first and second volume images based on the partial conversion relationship between the first and second partial regions.

The conversion function determination unit 224 normalizes the first partial region of the first volume image into a spherical region to generate a normalized spherical region. In an example, the conversion function determination unit 224 converts the first partial region of the first volume image into an ellipsoidal region, converts the ellipsoidal region into a spherical region, and normalizes the spherical region based on Equations 6-10 to generate the normalized spherical region. Similarly, the conversion function determination unit 224 normalizes the second partial region of the second volume image into a spherical region to generate a normalized spherical region.

The conversion function determination unit 224 determines one or more parameters to convert each of the first and second partial regions into a spherical region, and determines the partial conversion relationship between the first and second partial regions based on the parameters. In an example, the conversion function determination unit 224 defines the spherical region with respect to voxels $x_1$ corresponding to the first partial region, as in Equation 11, which is a modification of Equation 8.

$$y_1 = R_1 \Sigma^{-T/2}(x_1 - c_1) \qquad \text{[Equation 11]}$$

In Equation 11, $c_1$ denotes a central voxel from among the voxels included in the ellipsoidal region, $\Sigma$ denotes a covariance matrix, and $R_1$ denotes a rotation matrix of the first partial region. Similarly, in an example, the conversion function determination unit 224 defines the spherical region with respect to voxels $x_2$ corresponding to the second partial region, as in Equation 12, which is a modification of Equation 8.

$$y_2 = R_2 \Sigma^{-T/2}(x_2 - c_2) \qquad \text{[Equation 12]}$$

In Equation 12, $c_2$ denotes a central voxel from among the voxels included in the ellipsoidal region, $\Sigma$ denotes a covariance matrix, and $R_2$ denotes a rotation matrix of the second partial region.

The conversion function determination unit 224 determines the partial conversion relationship between the first and second partial regions based on the determined parameter. The determined parameter includes a first parameter for the first partial region, and a second parameter for the second partial region. The first parameter includes one or more of a first parameter representing a location change of the voxels corresponding to the first partial region and a first parameter representing an orientation transformation of the voxels corresponding to the first partial region. The second parameter includes one or more of a second parameter representing a location change of the voxels corresponding to the second partial region and a second parameter representing an orientation transformation of the voxels corresponding to the second partial region. In an example, the first and second parameters representing location changes denote covariance matrices, and the first and second parameters representing orientation transformations denote rotation matrices. In another example, the first parameter and the second parameter correspond to the above-described parameters extracted from the conversion relationships to generate the conversion information.

The conversion function determination unit 224 determines the partial conversion relationship between the first and second partial regions based on the first and second parameters. In an example, the conversion function determination unit 224 defines the partial conversion relationship between the first and second partial regions as in Equation 13, which is a modification of Equations 11 and 12.

$$x_1 = \Sigma_1^{T/2} R_1^T R_2 \Sigma_2^{-T/2}(x_2 - c_2) + c_1 \qquad \text{[Equation 13]}$$

Referring to Equation 13, the conversion relationship between the first partial region and the second partial region may be defined as a relationship in which the voxels $x_2$ corresponding to the second partial region are converted into the voxels $x_1$ corresponding to the first partial region.

The conversion function determination unit 224 determines the conversion relationship between the first and second volume images, based on the partial conversion relationship between the first and second partial regions. In general, the conversion relationship between the first volume image and the second volume image denotes a conversion relationship between voxels corresponding to the second volume image and voxels corresponding to the first volume image. The conversion relationship between the voxels corresponding to the first volume image and the voxels corresponding to the second volume image denotes a conversion relationship of the voxels corresponding to the second volume image to match the voxels corresponding to the second volume image to the voxels corresponding to the first volume image. In an example, the voxels corresponding to the first volume image denotes the voxels included in the first volume image. Similarly, the voxels corresponding to the second volume image denotes the voxels included in the second volume image. However, the scope of the voxels is not limited thereto. In another example, the voxels corresponding to the first volume image denote only voxels having intensities equal to or greater than a critical value from among the voxels included in the first volume image. Accordingly, in this example, the determination of the conversion relationship between the first and second volume images based on the conversion relationship between the first and second partial regions denotes conversion of the voxels included in the first volume image into the voxels included in the second volume image based on the conversion relationship between the first and second partial regions. In this example, the conversion function determination unit 224 uses Equation 13 representing the conversion relationship between the first and second partial regions to convert the voxels included in the first volume image into the voxels included in the second volume image.

In an example, the conversion function determination unit 224 determines a partial conversion relationship between each of a plurality of first partial regions and each of a plurality of second partial regions, the first and second partial regions constituting a plurality of corresponding pairs. In this example, the conversion function determination unit 224 determines a first partial conversion relationship between one of the first partial regions and a second partial region corresponding to the one first partial region from among the second partial regions, and determines a second partial conversion relationship between another of the first partial regions and a second partial region corresponding to the another first partial region from among the second partial regions. In another example, the conversion function determination unit 224 determines the conversion relationship between the first volume image and the second volume image, based on a plurality of partial conversion relationships. In yet another example, the conversion function determination unit 224 determines the conversion relationship between the first volume image and the second volume image, based on one or more selected from the plurality of partial conversion relationships.

In an example, the conversion function determination unit 224 warps the second volume image in relation to the first volume image according to each of the partial conversion relationships to select one or more from the plurality of partial conversion relationships, and compares results of the warping. In this example, the conversion function determination unit 224 compares a result of warping the second volume image based on a first conversion relationship with a result of warping the second volume image based on a second conversion relationship, and selects the first or second conversion relationship according to a result of the comparison.

In general, the conversion function determination unit 224 uses a similarity between volumes to compare the result of warping the second volume image based on the first conversion relationship with the result of warping the second volume image based on the second conversion relationship. The similarity between volumes denotes a similarity between the result of warping the second volume image based on one of the conversion relationships and the first volume image. Accordingly, in an example, the conversion function determination unit 224 calculates a first similarity between the result of warping the second volume image based on the first conversion relationship and the first volume image and a second similarity between the result of warping the second volume image based on the second conversion relationship and the first volume image, and selects the first similarity having a higher value than the second similarity and the first conversion relationship corresponding to the first similarity. In an example, the similarity between volumes is a similarity between a distribution of the intensities of the voxels of the first volume image and a distribution of the intensities of the voxels of the result of the warping the second volume image, or a similarity in the magnitude and direction of an intensity gradient between voxels corresponding to same locations. Normalized mutual information is an example of the similarity between the distributions of the intensities of the voxels.

The conversion function determination unit 224 determines the conversion relationship between the first and second volume images, based on the partial conversion relationship between the first and second partial regions. In an example, the partial conversion relationship between the first partial region and the second partial region denotes one or more partial conversion relationships selected from a plurality of conversion relationships based on a plurality of similarities as described above. In an example, the conversion function determination unit 224 selects M partial conversion relationships from a plurality of partial conversion relationships and determines a partial conversion relationship maximizing the similarity between the first volume image and the second volume image, by applying an optimization algorithm to the M partial conversion relationships. An example of the optimization algorithm is a Downhill Simplex. However, the optimization algorithm may be any optimization algorithm known to one of ordinary skill in the art. For example, the optimization algorithm may be not only a Downhill simplex algorithm but also a Conjugate Gradient algorithm, a Powell algorithm, or any optimization algorithm known to one of ordinary skill in the art, or may also be a group of a plurality of optimization algorithms. In an example, when N (M>N) partial conversion relationships are selected from the plurality of partial conversion relationships, the conversion function determination unit 224 samples and generates L (L=M−N) partial conversion relationships, of which there are a shortage, from around each of the first partial regions and the second partial regions associated with the N partial conversion relationships.

In an example, the conversion function determination unit 224 determines the conversion relationship between the first volume image and the second volume image based on one or more of the plurality of partial conversion relationships as it is without applying the optimization algorithm. In another example, the conversion function determination unit 224 determines Equation 13 to be the conversion relationship to represent the partial conversion relationship between the first volume image and the second volume image.

In an example, the conversion function determination unit 224 performs refinement with respect to the determined conversion relationship. The conversion function determination unit 224 performs refinement with respect to the determined conversion relationship by applying the determined conversion relationship to the second volume image, sampling a conversion relationship between a result of the application of the conversion relationship and the second volume image, and applying the optimization algorithm to the sampled conversion relationship again. The refinement denotes updating of the conversion relationship.

Non-described matters of the volume-panorama image generating apparatus 100 of FIG. 10 are the same as those described above with respect to the volume-panorama image generating apparatus 20 of FIG. 2 or can be easily inferred from the description by one of ordinary skill in the art, so a description thereof will be omitted.

Figure 11:
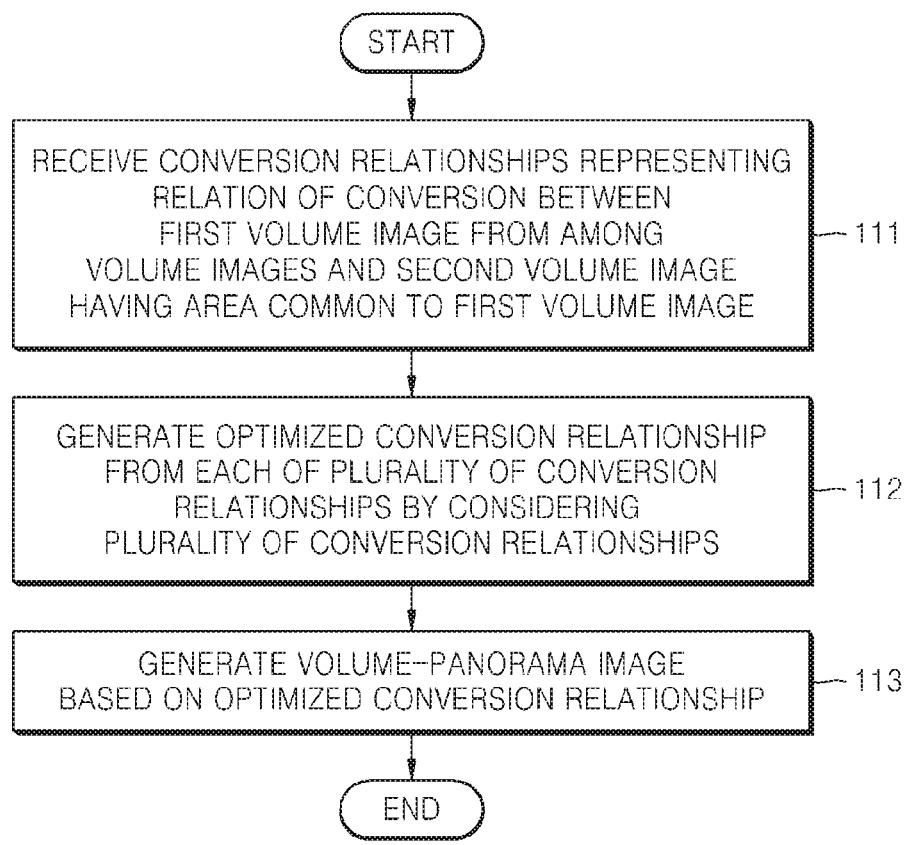
FIG. 11 is a flowchart illustrating an example of a volume-panorama image generating method.

FIG. 11 is a flowchart illustrating an example of a volume-panorama image generating method. In an example, the volume-panorama image generating apparatus 20 of FIG. 2 performs the volume-panorama image generating method of FIG. 11. Accordingly, the description made above with respect to the volume-panorama image generating apparatus 20 of FIG. 2 is applied even to non-described matters of the volume-panorama image generating method of FIG. 11.

The input unit 21 receives (111) a conversion relationship representing a conversion relationship between the first volume image from among the volume images and a second volume image having an area common to the first volume image. The image processor 22 generates (112) an optimized conversion relationship from each of a plurality of conversion relationships based on the conversion relationships. The image processor 22 generates (113) the volume-panorama image based on the optimized conversion relationships.

FIG. 12 is a flowchart illustrating another example of a volume-panorama image generating method. In an example, the volume-panorama image generating apparatus 100 of FIG. 10 performs the volume-panorama image generating method of FIG. 12. Accordingly, the description made above with respect to the volume-panorama image generating apparatus 100 of FIG. 10 is applied even to non-described matters of the volume-panorama image generating method of FIG. 12.

The input unit 21 receives (121) the pieces of image data of the plurality of volume images. The image processor 1022 determines (122) the conversion relationship representing a conversion relationship between the first volume image from among the volume images and the second volume image having an area common to the first volume image, based on the image data pieces of the volume images. The image processor 1022 generates (123) an optimized conversion relationship from each of a plurality of conversion relationships based on the conversion relationships. The image processor 1022 generates (124) the volume-panorama image based on the optimized conversion relationships.

The units described herein may be implemented using hardware components and software components, such as, for example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. In addition, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a volume-panorama image, comprising:
    acquiring at least two conversion relationships between a plurality of volume images, each of the acquired conversion relationships being between sequential volume images among the plurality of volume images;
    generating an optimized conversion relationship from the acquired conversion relationships; and
    generating the volume-panorama image based on the generated optimized conversion relationship,
    wherein the generating of the optimized conversion relationship comprises determining a similarity between morphological characteristics of the sequential volume images based on the each of the acquired conversion relationships and generating the optimized conversion relationship based on similarities comprising the determined similarity, and
    wherein the determining of the similarity between the morphological characteristics comprises comparing one or more of locations of voxels in the sequential volume images and intensities of voxels in the sequential volume images.

2. The method of claim 1, wherein the generating of the optimized conversion relationship further comprises changing the acquired conversion relationships to maximize a sum of the similarities and generating the optimized conversion relationship based on the changed conversion relationships.

3. The method of claim 1, wherein the determined similarity comprises a similarity between a warped morphological characteristic of a second volume image based on one of the acquired conversion relationships and the morphological characteristic of a first volume image.

4. The method of claim 1, further comprising:
    receiving pieces of image data of the plurality of volume images,
    wherein the generating of the volume-panorama image comprises generating image data representing the volume-panorama image from the pieces of image data based on the generated optimized conversion relationship.

5. The method of claim 4, wherein the generating of the volume-panorama image further comprises generating image data of a volume image that is to be combined with a first volume image from the image data of a second volume image based on the generated optimized conversion relationship, and
    wherein the generating of the image data representing the volume-panorama image comprises combining image data of the first volume image with the generated image data of the volume image that is to be combined with the first volume image.

6. The method of claim 5, wherein the generating of the volume-panorama image further comprises determining a local conversion relationship based on local volume images into which the volume image that is to be combined with the first volume image is split and updating the generated image data of the volume image that is to be combined with the first volume image based on the determined local conversion relationship.

7. The method of claim 1, wherein one of the acquired conversion relationships is determined based on a partial conversion relationship, the partial conversion relationship represents conversion relationships being between a partial region of a first volume image and a partial region of a second volume image.

8. The method of claim 7, wherein the one of the acquired conversion relationships is determined based on one or more parameters that normalizes the partial region of the first volume image and the partial region of the second volume image into spherical regions.

9. A non-transitory computer-readable recording medium having recorded thereon a program for executing the method of claim 1.

10. An apparatus to generate a volume-panorama image, comprising:
    an image processor configured to acquire at least two conversion relationships between a plurality of volume images, each of the acquired conversion relationships being between sequential volume images among the plurality of volume images, determine a similarity between morphological characteristics of the sequential volume images based on the each of the acquired conversion relationships, generate an optimized conversion relationship from the acquired conversion relationships based on similarities comprising the determined similarity, generate the volume-panorama image based on the optimized conversion relationship; and output the generated volume-panorama image,
    wherein the image processor is further configured to determine the similarity between the morphological characteristics by comparing one or more of locations of voxels in the sequential volume images and intensities of voxels in the sequential volume images.

11. The apparatus of claim 10, wherein the image processor is further configured to change the acquired conversion relationships to maximize a sum of the similarities and generate the optimized conversion relationship based on the changed conversion relationships.

12. The apparatus of claim 10, wherein the determined similarity comprises a similarity between a warped morphological characteristic of a second volume image based on the one of the acquired conversion relationships and a morphological characteristic of a first volume image.

13. The apparatus of claim 10,
    wherein the image processor generates image data representing the volume-panorama image from received pieces of image data within the plurality of volume images based on the generated optimized conversion relationship.

14. The apparatus of claim 13, wherein the image processor is further configured to generate image data of a volume image that is to be combined with a first volume image from image data of a second volume image based on the generated optimized conversion relationship and generate image data representing the volume-panorama image by combining image data of the first volume image with the generated image data of the volume image that is to be combined with the first volume image.

15. The apparatus of claim 14, wherein the image processor is further configured to determine a local conversion relationship based on local volume images into which the volume image that is to be combined with the first volume image is split and update the generated image data of the volume image that is to be combined with the first volume image based on the determined local conversion relationship.

16. The apparatus of claim 10, wherein one of the acquired conversion relationships is determined based on a partial conversion relationship, the partial conversion relationship represents conversion relationships being between a partial region of a first volume image and a partial region of a second volume image.

17. The apparatus of claim 16, wherein the one of the acquired conversion relationships is determined based on one or more parameters that normalizes the partial region of the first volume image and the partial region of the second volume image into spherical regions.

18. The apparatus of claim 10, further comprising a memory storing instructions that, when executed by the image processor, cause the image processor to perform the acquiring of the at least two conversion relationships, the determining of the similarity, the generating of the optimized conversion relationship, and the generating of the volume-panorama image.

19. The apparatus of claim 18, wherein for the generating of the optimized conversion relationships, the image processor is configured to generate conversion information representing a plurality of conversion relationships including the at least two conversion relationships, and generate the optimized conversion relationship from the plurality of conversion relationships based on the conversion information.

20. The apparatus of claim 10,
wherein the image processor is further configured to
determine a plurality of conversion relationships including the at least two conversion relationships based on the received pieces of the image data, and generate the optimized conversion relationship from the determined plurality of conversion relationships.

21. The method of claim 1, wherein the similarity between the morphological characteristics is determined by generating an intensity gradient that is determined based on intensities of voxels in predetermined regions of the sequential volume images.

22. The apparatus of claim 10, wherein the image processor is further configured to determine the similarity between the morphological characteristics by generating an intensity gradient that is determined based on intensities of voxels in predetermined regions of the sequential volume images.

* * * * *